(12) United States Patent
Sekihata (10) Patent No.: US 7,130,271 B1
(45) Date of Patent: Oct. 31, 2006

(54) RELAYING APPARATUS

(75) Inventor: Osamu Sekihata, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,421

(22) Filed: Mar. 15, 2000

(30) Foreign Application Priority Data

Mar. 17, 1999 (JP) .................................. 11-072150

(51) Int. Cl.
*H04J 3/20* (2006.01)

(52) U.S. Cl. .................................................. 370/236

(58) Field of Classification Search ................ 370/229, 370/230, 236, 414, 415, 446, 401, 231–232, 370/233, 234, 235, 389, 465, 252, 254, 241, 370/428, 412, 413, 416, 417, 418, 419
See application file for complete search history.

(56) References Cited

U.S. PATENT DOCUMENTS

| | | | |
|---|---|---|---|
| 5,442,624 A * | 8/1995 | Bonomi et al. | 370/231 |
| 5,787,071 A * | 7/1998 | Basso et al. | 370/231 |
| 6,118,761 A * | 9/2000 | Kalkunte et al. | 370/229 |
| 6,151,301 A * | 11/2000 | Holden | 370/232 |
| 6,426,944 B1 * | 7/2002 | Moore | 370/226 |
| 6,490,248 B1 * | 12/2002 | Shimojo | 370/229 |
| 6,714,517 B1 * | 3/2004 | Fawaz et al. | 370/236 |

FOREIGN PATENT DOCUMENTS

| JP | 247943 | 2/1990 |
|---|---|---|
| JP | 4142836 | 5/1992 |

* cited by examiner

*Primary Examiner*—Doris H. To
*Assistant Examiner*—Robert W. Wilson
(74) *Attorney, Agent, or Firm*—Katten Muchin Rosenman LLP (57) ABSTRACT

In a relaying apparatus detecting a congested state and performing a flow control, an output buffer using an up-link or a stack-link is monitored. When the up-link or the stack-link is in a congested state, a transmission restriction is imposed on a port which is a transmitting source of a corresponding frame. Furthermore, when a plurality of relaying apparatuses are connected through stack-links, the relaying apparatus having the up-link detects the congested state of the up-link and notifies a second relaying apparatus of the congested state to make a transmission restriction.

15 Claims, 10 Drawing Sheets

RELAYING APPARATUS

BACKGROUND OF THE INVENTION

1. Field of the Invention

The present invention relates to a relaying apparatus, and in particular to a relaying apparatus which detects a congested or uncongested state to perform a data flow control.

2. Description of the Related Art

Figure 9:
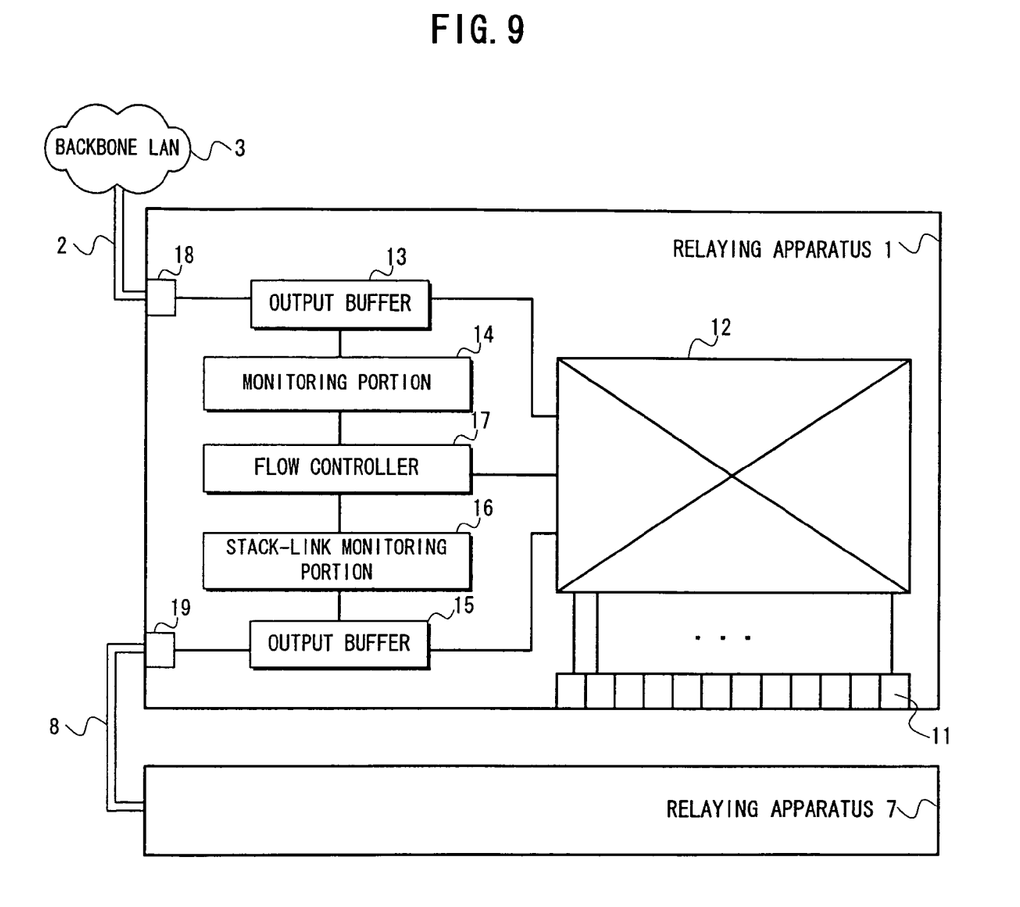
FIG. 9 is a block diagram showing an arrangement of a relaying apparatus used in the present invention and the prior art.

FIG. 9 shows an arrangement of a conventionally known relaying apparatus used in a LAN (Local Area Network) i.e. collection of computers that share data and resources in one primary location. A relaying apparatus 1 is connected to a backbone LAN 3 through an up-link 2 and is also connected to a second relaying apparatus 7 through a stack-link 8.

The internal arrangements of the relaying apparatus 1 and the relaying apparatus 7 are common, so that taking the relaying apparatus 1 as an example for the sake of description, ports (e.g. Input/Output ports) 11 which can be connected to terminals (not shown) such as personal computers and switches/repeater hubs are connected to a switching portion 12. The ports 11 can automatically recognize the bandwidth of the interfaces (i.e. the 10BASE-T (10 Mbps) and the 100BASE-TX (100 Mbps)) according to the IEEE802.3 standard.

This IEEE802.3 standard deals with Ethernet which is the most widely used LAN technology. The above-noted 10BASE-T is the original and most common version of Ethernet and denotes a peak transmission speed of 10 Mbps. Newer versions of Ethernet called "Fast Ethernet" and "Gigabit Ethernet" support data rates of 100 Mbps and 1 Gbps (1000 Mbps), respectively, including the standards of the 100BASE-TX as above-noted and the 1000BASE-X.

An output buffer 13 is provided between the switching portion 12 and the up-link 2, and the number of frame staying at the output buffer 13 is monitored by a monitoring portion 14 so that the state of the up-link 2 may be always monitored.

In addition, an output buffer 15 is provided between the switching portion 12 and the stack-link 8, and a stack-link monitoring portion 16 is connected to the output buffer 15 in the same way as the up-link 2 so that the number of frame staying at the output buffer 15 before the stack-link 8 can be always monitored.

The monitoring portions 14 and 16 are connected to a flow controller 17, so that when the monitoring portions 14 and 16 respectively detect the congested state of the links 2 and 8 the congested state is notified to the flow controller 17.

It is to be noted that an interface 18 is provided between the output buffer 13 and the up-link 2 as well as an interface 19 is provided between the output buffer 15 and the stack-link 8.

Furthermore, although this arrangement illustrates only the case where frames are outputted from the relaying apparatus 1 to the up-link 2 and the stack-link 8, input portions and the like necessary for the case where the frames are conversely inputted from the up-link 2 and the stack-link 8 are not illustrated for the sake of simplifying the figure.

The congested state which may occur in such a conventional relaying apparatus will be described more specifically referring to FIGS. 10 and 11.

Figure 10:
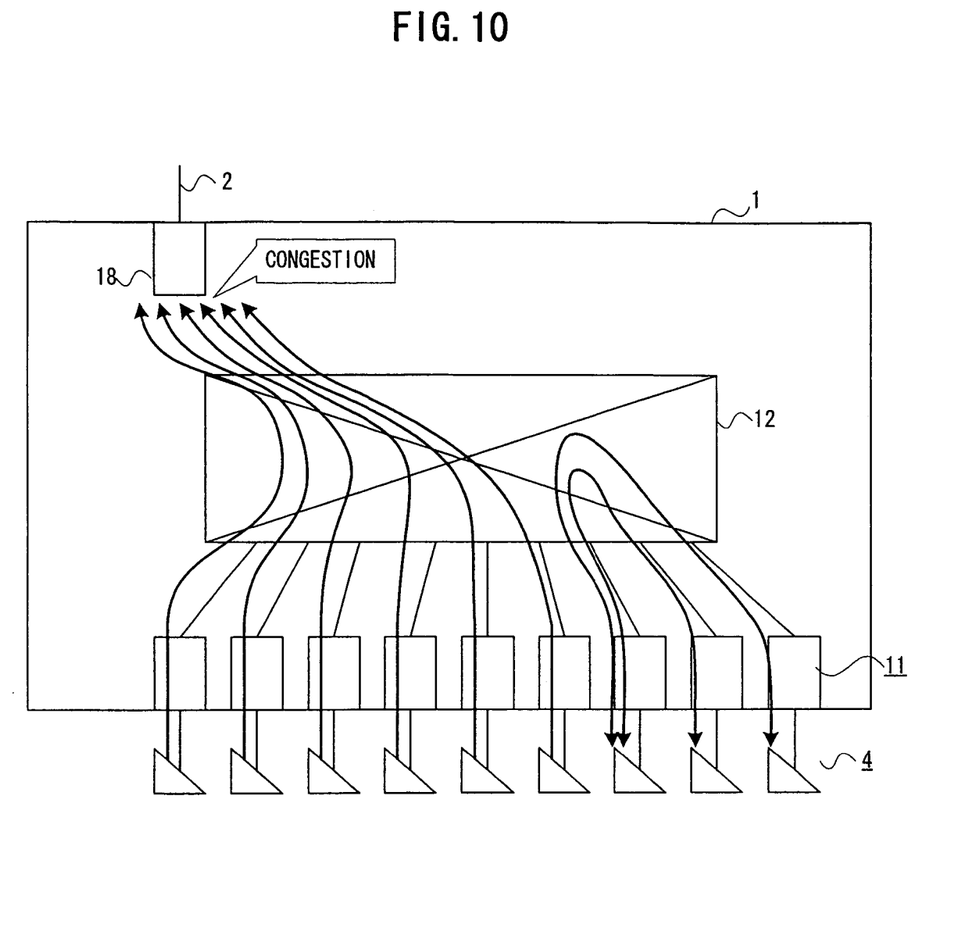
FIG. 10 is a diagram for illustrating a general congested state (1) in a relaying apparatus.

Firstly, in the example of FIG. 10, only six arrows are shown toward the up-link 2. However, assuming that the interface 18 of the up-link 2 is a "Gigabit Ethernet" type (ex. 1000BASE-X) as above-noted and the ports are the "Fast Ethernet" type (ex. 100BASE-TX (100 Mbps interface)) as above-noted, when the ports 11 having terminal ports more than ten on the calculation try to simultaneously communicate with the up-link 2 with a full wire (upper limit of a transmission line capability) the processing capability of the up-link interface 18 is physically exceeded, resulting in a congested state.

Figure 11:
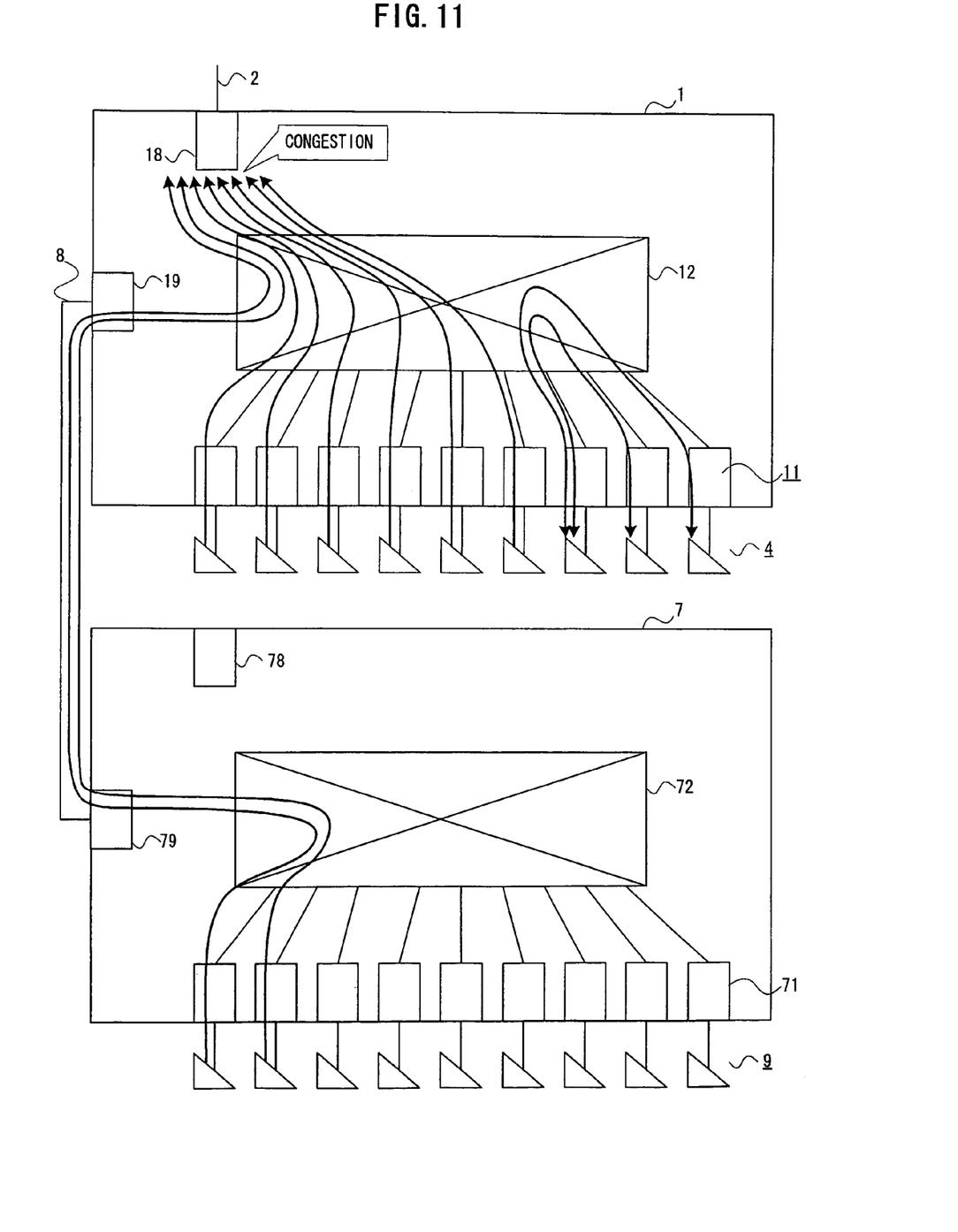
FIG. 11 is a diagram for illustrating a general congested state (2) in a relaying apparatus.

In the example of FIG. 11, six arrows are shown from a part of terminals 4 connected to the ports 11 of the relaying apparatus 1 to the interface 18, and further two arrows are shown from a part of terminals 9 connected to ports 71 in a second relaying apparatus 7 connected to the relaying apparatus 1 through the stack-line 8, so that eight arrows are shown in total. Likewise in this case, when more than ten terminal ports 11 and 71 on the calculation are simultaneously connected to the up-link 2 with the full wire, the processing capability of the interface 18 is physically exceeded, resulting in a congested state.

When such a congested state occurs and the notification thereof is provided to the flow controller 17 from the monitoring portion 14 or 16, the flow controller 17 controls to either transmit a congestion signal to the switching portion 12 or substantially stop the following communication by intentionally generating a collision state in the ports 11 in case that the above-mentioned interfaces 10BASE-T and 100BASE-TX are a half-duplex communication type.

Also, in the above-mentioned international standard IEEE802.3X, when the number of buffer staying frame exceeds a fixed threshold value, a "pause" frame is transmitted to the link connected to the ports 11, so that the control to stop the transmission of frame is performed on the reception side of the pause frame until a timer expires.

In the control method of transmitting the congestion signal or generating the compulsory collision state as is the case with the above-mentioned conventional relaying apparatus, there is a problem that the inputs to the ports must be entirely stopped.

Also, in the international standard IEEE802.3X, if a plurality of relaying apparatuses are mutually connected as shown in FIG. 9, a flow control by the whole of a relaying apparatus can be performed, while the flow control by an individual port can not. In addition, if the flow control by the whole apparatus is performed, it is disadvantageous that the control is performed even to communications which have nothing to do with the congested state of the up-link or the stack-link such as the communication within the apparatus.

SUMMARY OF THE INVENTION

It is accordingly an object of the present invention to provide a relaying apparatus which performs a flow control without stopping inputs/outputs to ports and influencing communications which have nothing to do with a congested state when a up-link or a stack-link has the congested state.

In consideration of the above-mentioned object, a relaying apparatus according to the present invention aims at performing an input control by an individual port to prevent frames from being abandoned.

Figure 1:
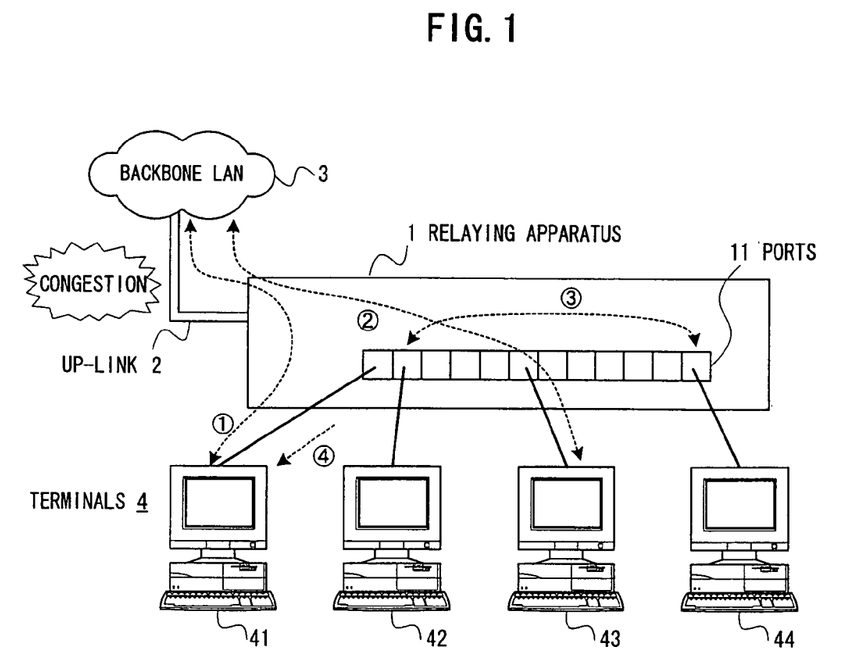
FIG. 1 is a block diagram showing a principle arrangement (1) of a relaying apparatus according to the present invention.

FIG. 1 illustrates a principle arrangement (1) of a relaying apparatus according to the present invention, in which the same reference numerals are attached to the same portions as those in FIG. 9. It is to be noted that four terminals 41–44 as the terminals 4 are connected to the ports 11 in the example of FIG. 1 and the ports 11 can automatically recognize the 10BASE-T or the 100BASE-TX interface in the same way as the prior art example of FIG. 9.

In operation, it is now assumed that the terminals 41 and 43 among the terminals 4 transmit/receive frames to/from the backbone LAN 3 as shown by ① and ②, and the terminals 42 and 44 mutually communicate through the switching portion (not shown) within the relaying apparatus 1 as shown by ③.

In such a state, if it is further assumed that the up-link 2 has the congested state, the monitoring portion (not shown) of the relaying apparatus 1 firstly detects the congested state of the up-link 2.

Thus, the flow controller (not shown) of the relaying apparatus 1 controls the ports 11 by imposing a transmission restriction on the terminals 41 and 43 which uses the up-link 2.

In this case, the relaying apparatus 1 may perform the input control to both of the terminals 41 and 43 or may perform the input control to one of the terminals 41 and 43 which is the minimum number of the terminals if the congested state is released as shown by ④.

In this way, it becomes possible to perform the flow control when the congestion occurs at the up-link 2 without imposing any restriction on the communication between the terminals 42 and 44.

Although only the up-link 2 is shown in the example of FIG. 1, the stack-link monitoring portion may detect the congested state of the stack-link connected to the ports 11 through the switching portion when the relaying apparatus is connected to a second relaying apparatus through the stack-link, and the above-mentioned flow controller may impose the transmission restriction on a port using a stack-link among the ports 11 for releasing the congested state when the stack-link monitoring portion detects the congested state.

Also, in the above case, the flow controller may impose the transmission restriction by renewing a negotiation with the port and decreasing a link speed.

Hereinafter, the operation at this time will be described referring to FIG. 2.

Firstly, from the initial state (at step S1), the monitoring portion or the stack-link monitoring portion monitors whether or not the congested state occurs (at step S2). When it is found that the up-link or the stack-link is in the congested state, a port using an up-link or the stack-link among the ports 11 is confirmed (at step S3), so that whether or not the port is communicating at 100 Mbps is determined (at step S4).

As a result, when the port is not communicating at 100 Mbps, or is communicating at 10 Mbps, the next port is confirmed (at step S5).

At step S4, when it is found that the port is communicating at 100 Mbps, the negotiation for communicating at 10 Mbps is performed to the port (at step S6). Then at the monitoring portion or the stack-link monitoring portion the congested state is monitored again (at step S7). When the congested state is released, an initializing negotiation is performed to the above-mentioned port (at step S8).

Figure 3:
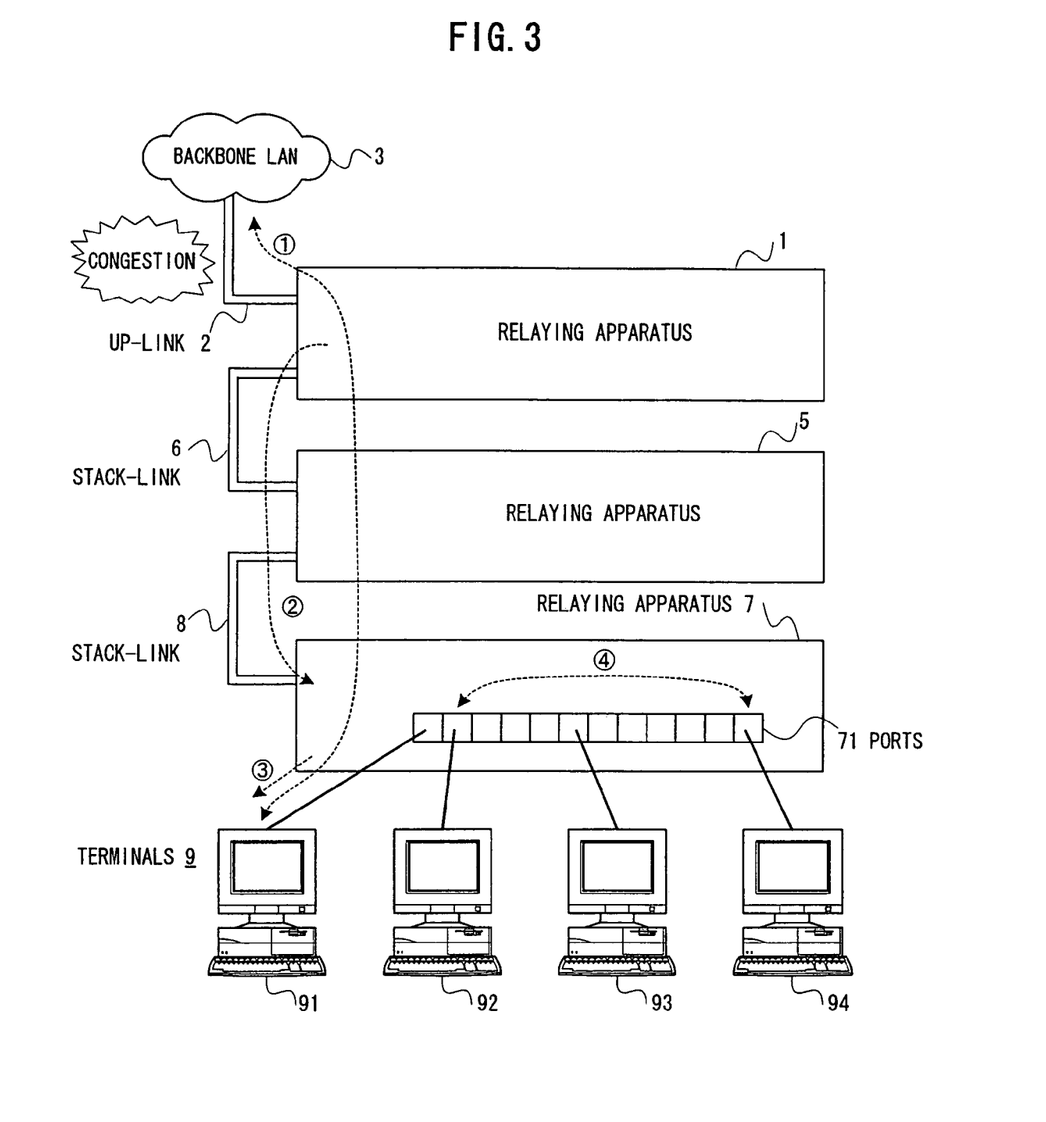
FIG. 3 is a block diagram showing a principle arrangement (2) of a relaying apparatus according to the present invention.

In case of a principle arrangement (2) of the present invention shown in FIG. 3, the relaying apparatuses 1, 5, and 7 are sequentially connected in the form of stack. Namely, the relaying apparatuses 1 and 5 are mutually connected with a stack-link 6 and the relaying apparatuses 5 and 7 are mutually connected with a stack-link 8.

In such an example, a terminal 91 among terminals 9 connected to the relaying apparatus 7 from the ports 71 is assumed to transmit/receive the frames to/from the backbone LAN 3 through the stack-link 8, the relaying apparatus 5, the stack-link 6, and the relaying apparatus 1 as shown by ①, and terminals 92 and 94 are assumed to mutually communicate through the relaying apparatus 7 as shown by ④.

In such a state, when the up-link 2 is made congested, the monitoring portion of the relaying apparatus 1 firstly detects the congested state of the up-link 2. The fact that the up-link 2 is in the congested state is notified to the flow controller of the relaying apparatus 7 through the stack-link 6, the relaying apparatus 5, and the stack-link 8 by using a notification frame as shown by ②.

The flow controller of the relaying apparatus 7 which has received the notification of the congested state of the up-link 2 imposes an input restriction on the terminal 91 using the up-link 2 in the same way as FIG. 1 as shown by ③.

Thus, the flow control can be performed even when the up-link 2 is in the congested state without imposing any restriction on the communication between the terminals 92 and 94 in the same way as FIG. 1.

It is to be noted that the above-mentioned notification frame may include MAC addresses of all of the ports using the links. Also, instead of the notification frame, a congestion notification signal of a specific pattern may be used.

Furthermore, when the number of frame staying at the output buffer exceeds a threshold value the above-mentioned monitoring portion may recognize that the congested state occurs and provides the MAC address in the frame to the flow controller which has a table for calculating a port corresponding to the MAC address. This table may be renewed at a fixed time interval.

When the number of frame staying at an output buffer is equal to or less than a threshold value the monitoring portion may transmit a release notification of the congested state to the flow controller which releases the transmission restriction.

BRIEF DESCRIPTION OF THE DRAWINGS

Throughout the figures, like reference numerals indicate like or corresponding components.

DESCRIPTION OF THE EMBODIMENTS

As an arrangement for an embodiment of a relaying apparatus according to the present invention, the same arrangement as the prior art example shown in FIG. 9 can be used. However, the operations of the monitoring portions 14, 16, and of the flow controller 17 are different between the present invention and the prior art example, which will be hereinafter described by the flow charts and the like.

Figure 2:
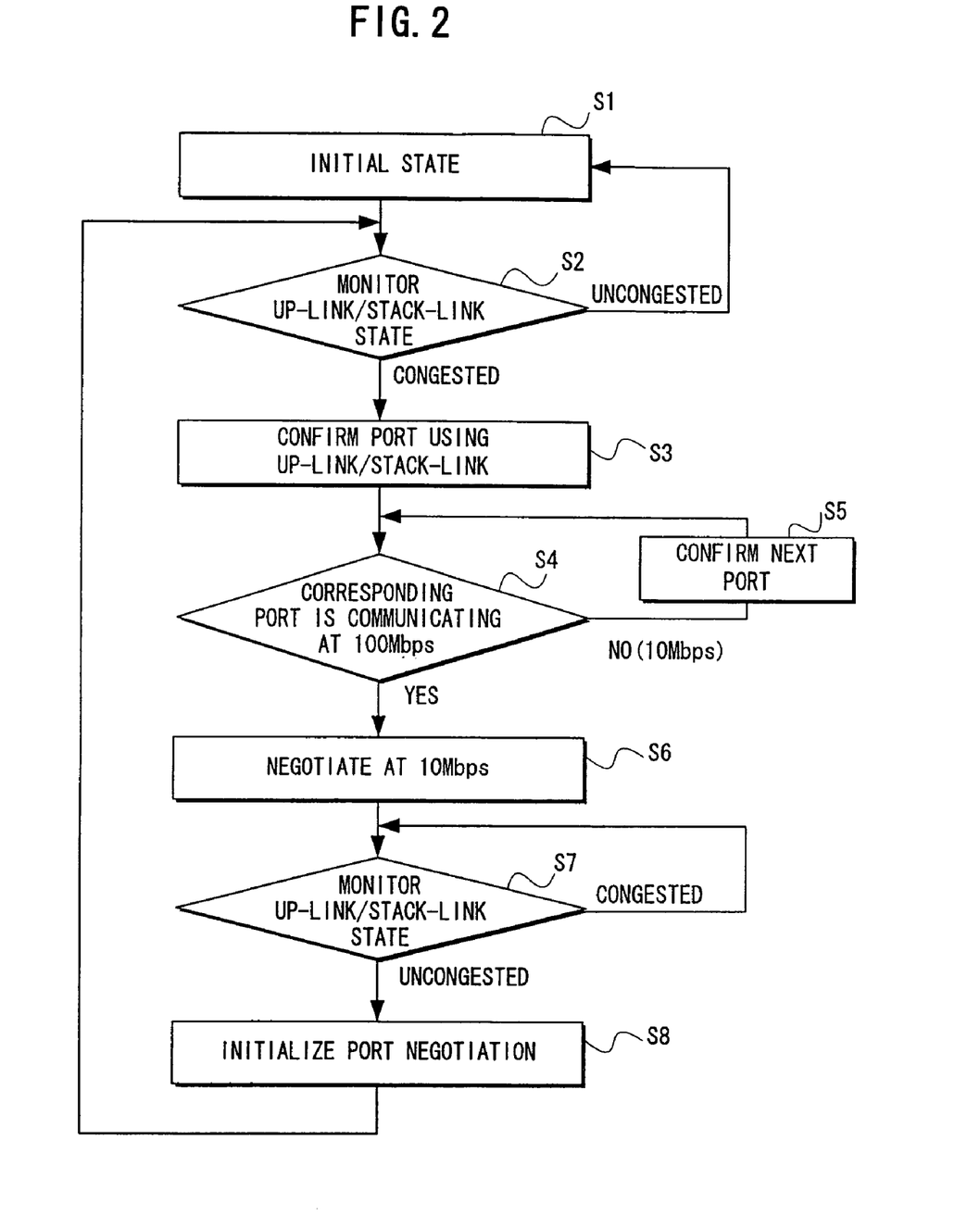
FIG. 2 is a flow chart showing the operation of a principle arrangement (1) of a relaying apparatus according to the present invention.
Figure 4:
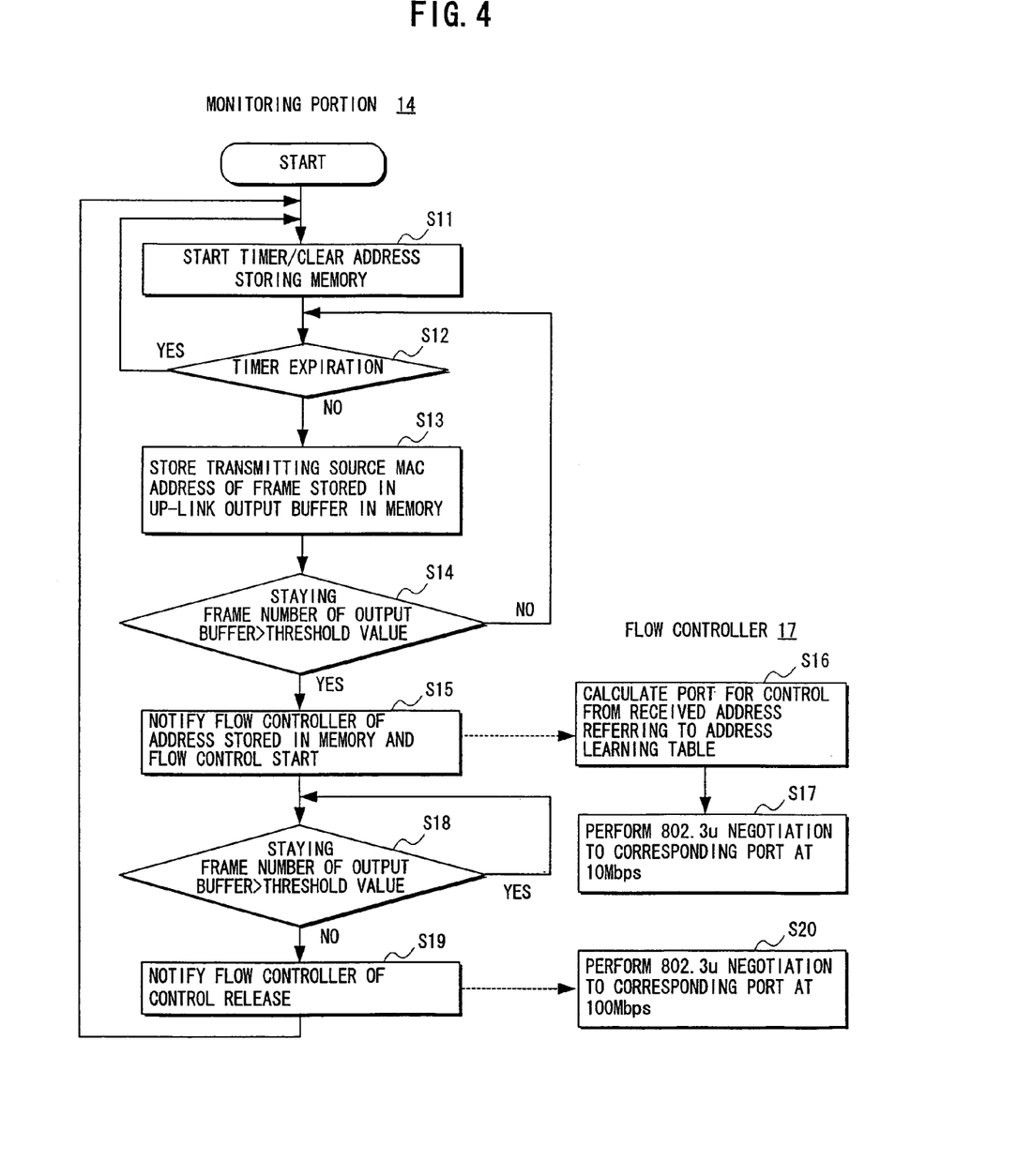
FIG. 4 is a flow chart showing an embodiment of an up-link control in a relaying apparatus according to the present invention.

FIG. 4 is a flow chart more specifically showing the embodiment of the up-link control in the operation flow of the present invention schematically shown in FIG. 2. Hereinafter, the operation of the embodiment of the present invention will be described referring to FIGS. 4 and 9.

In the monitoring portion 14, a built-in timer (not shown) is firstly started and an address storing memory (not shown) is cleared (at step S11). These operations are performed every time the timer expires (at step S12).

Then, a transmitting source MAC address of the frame stored in the up-link output buffer 13 is stored in the memory (at step S13) and the number of frame staying at the buffer 13 is counted from the address number stored in the memory to determine whether or not the frame number exceeds the threshold value (at step S14).

As a result, if the staying frame number does not exceed the threshold value the process returns to step S12, otherwise it is determined that the number of frames staying at the buffer 13 is so many that the up-link is in the congested state, thereby notifying the flow controller 17 of the address stored at step S13 and the start of flow control (at step S15).

At the flow controller 17, a built-in address learning table is referred to based on the transmitting source MAC address transmitted from the monitoring portion 14, so that the port 11 to be controlled is calculated from the corresponding address (at step S16). As a result, the 802.3u negotiation is performed to the calculated port 11 at 10 Mbps (at step S17).

Namely, by switching over the 100 Mbps link to the 10 Mbps link, the number of frame flowing into the up-link 2 is decreased, which enables the traffic amount of the up-link 2 to be decreased.

As a result, when the staying frame number of the output buffer 13 is less than the threshold value (at step S18), the monitoring portion 14 notifies the flow controller 17 of a control release (at step S19).

At the flow controller 17 which has received the control release notification, the 802.3u negotiation is performed to the corresponding port at 100 Mbps (at step S20), which enables the original processing capability to be restored.

While the control example of the up-link has been described in this embodiment, the relationship among the output buffer 15, the stack-link monitoring portion 16, and the flow controller 17 can be also realized in the same manner.

Namely, the monitoring portion 16 monitors whether or not the number of frames staying at the buffer 15 and transmitted from the ports 11 to the stack-link through the switching portion 12 exceeds the threshold value by monitoring the output buffer 15. When the staying number exceeding the threshold value is detected, the congested state of the stack-link 8 is notified to the flow controller 17.

At this time, the monitoring portion 16 recognizes the transmitting source MAC address of the frame to notify the flow controller 17 of the MAC address.

Accordingly, the flow controller 17 notified of the congested state of the stack-link 8 imposes the input restriction of frames on the port, corresponding to the above-mentioned MAC address, which is transmitting the frames to the stack-link 8 at this time.

It is to be noted that in any of the above-mentioned embodiments the transmission restriction may be imposed on the ports corresponding to all of the transmitting source MAC addresses or may be imposed only on the minimum number of the ports.

While the above-mentioned embodiments show the flow control in a single relaying apparatus as shown in FIG. 1, the flow control extending over a plurality of relaying apparatuses will be described referring to FIGS. 5–8 hereinafter.

Figure 5:
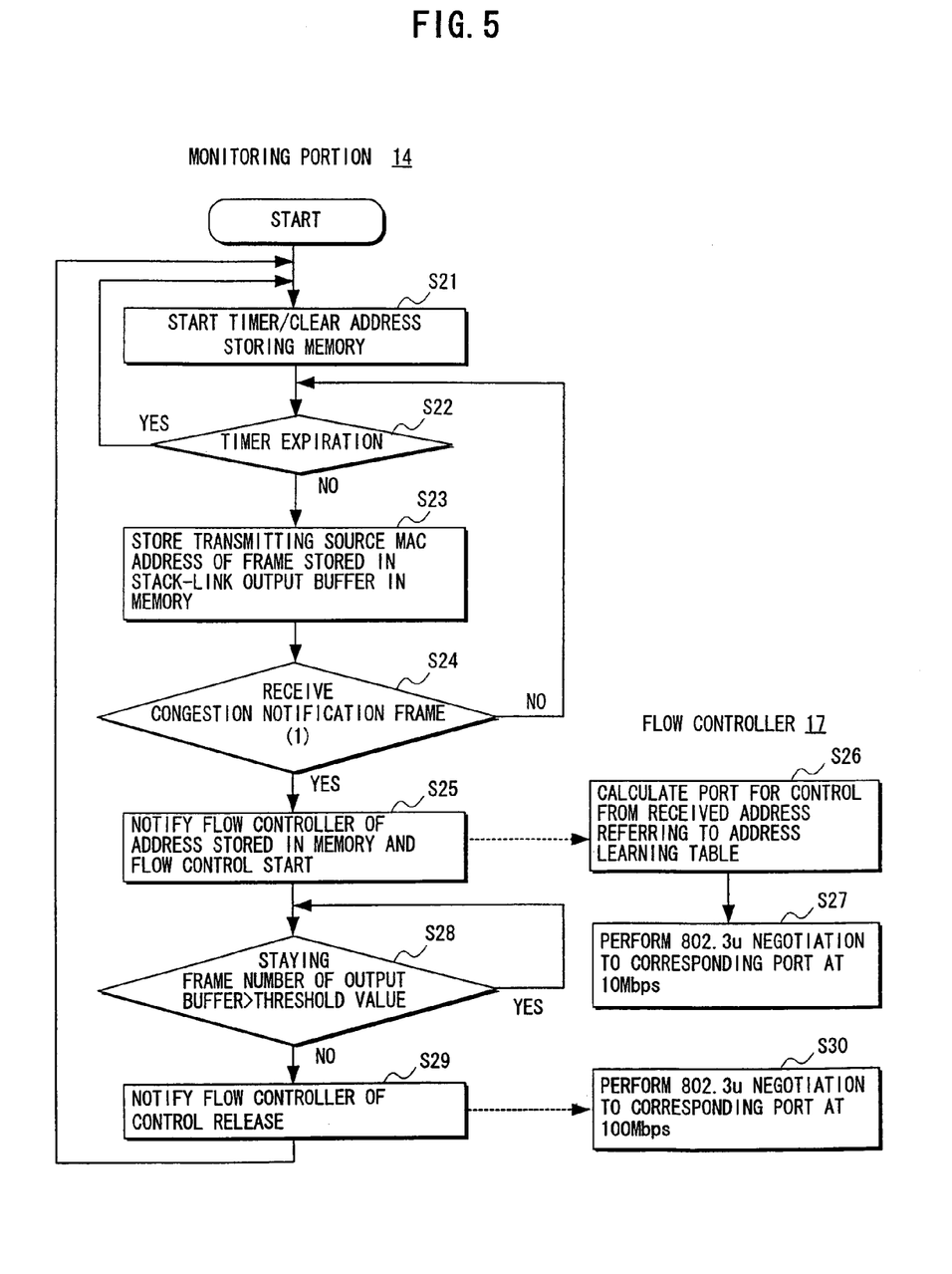
FIG. 5 is a flow chart showing an embodiment of a control using a congestion notification frame (1) in a relaying apparatus according to the present invention.

FIG. 5 shows an embodiment of a stack-link control when a congestion notification frame (1) as will be described later is used in the arrangement of the LAN apparatus as shown in FIG. 9.

Firstly, steps S21 and S22 correspond to steps S11 and S12 shown in FIG. 4, and then at step S23 the transmitting source MAC address of the frame stored in the stack-link output buffer, i.e. the output buffer 13 in the relaying apparatus 7 shown in FIG. 9 which can accordingly be referred to as the up-link output buffer in the same way as FIG. 9 is stored in the built-in memory.

The monitoring portion 14 determines whether or not the congestion notification frame (1) from the relaying apparatus 1 is received (at step S24).

Figure 6:
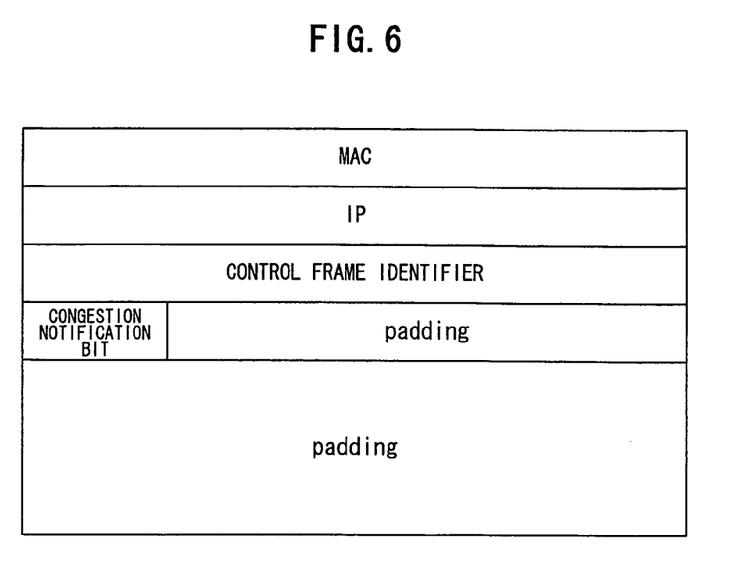
FIG. 6 is a format diagram showing a congestion notification frame (1) used in a relaying apparatus according to the present invention.

The embodiment of the congestion notification frame (1) is shown in FIG. 6, in which the congestion notification frame (1) is assumed to be an IP frame addressed to the relaying apparatus, and an identifier indicating a control frame and bits indicating the congested state of the up-link are set. It is to be noted that a transmitting destination address, a transmitting source address, a protocol, and the like are stored in "MAC" as well as a transmitting destination address, a transmitting source address, a variety of flags, and the like are stored in "IP". In addition, "padding" indicates dummy bits for filling blanks.

Such a congestion notification frame (1), as shown in the example in FIG. 3, is transmitted from the monitoring portion 14 in the relaying apparatus 1. The monitoring portion 14 can determine which relaying apparatus has the staying frame from the transmitting source MAC address stored in the built-in memory and can transmit the congestion notification frame (1) to the corresponding relaying apparatus according to the determination.

The monitoring portion 14 which has received the congestion notification frame (1) notifies the flow controller 17 of the transmitting source MAC address stored at step S23 and the start of the flow control (at step S25).

This process corresponds to step S15 in FIG. 4. In the flow controller 17, steps S26 and S27 are executed, corresponding to steps S16 and S17 in FIG. 4.

When it is found that the staying frame number of the output buffer 13 is less than the threshold value as a result of imposing the input restriction on the port by negotiations at the flow controller 17 in that way (at step S28), the monitoring portion 14 notifies the flow controller 17 of the control release (at step S29). In response thereto, the flow controller 17 releases the input restriction in the same way as step S20 in FIG. 4.

It is to be noted that since the congested state in this case varies depending on the transmission status of the frames from each of the relaying apparatuses to the up-link 2 the transmission restriction is to be imposed on the ports corresponding to the transmitting source MAC addresses of all of the frames staying at the up-link output buffer 13.

In the embodiment shown in FIG. 5, the congestion notification frame (1) notifies the second relaying apparatus through the stack-link of only the fact that the congested state has occurred somehow. However, in the embodiment shown in FIG. 7, the control of the stack-link is performed by using a congestion notification frame (2).

Figure 7:
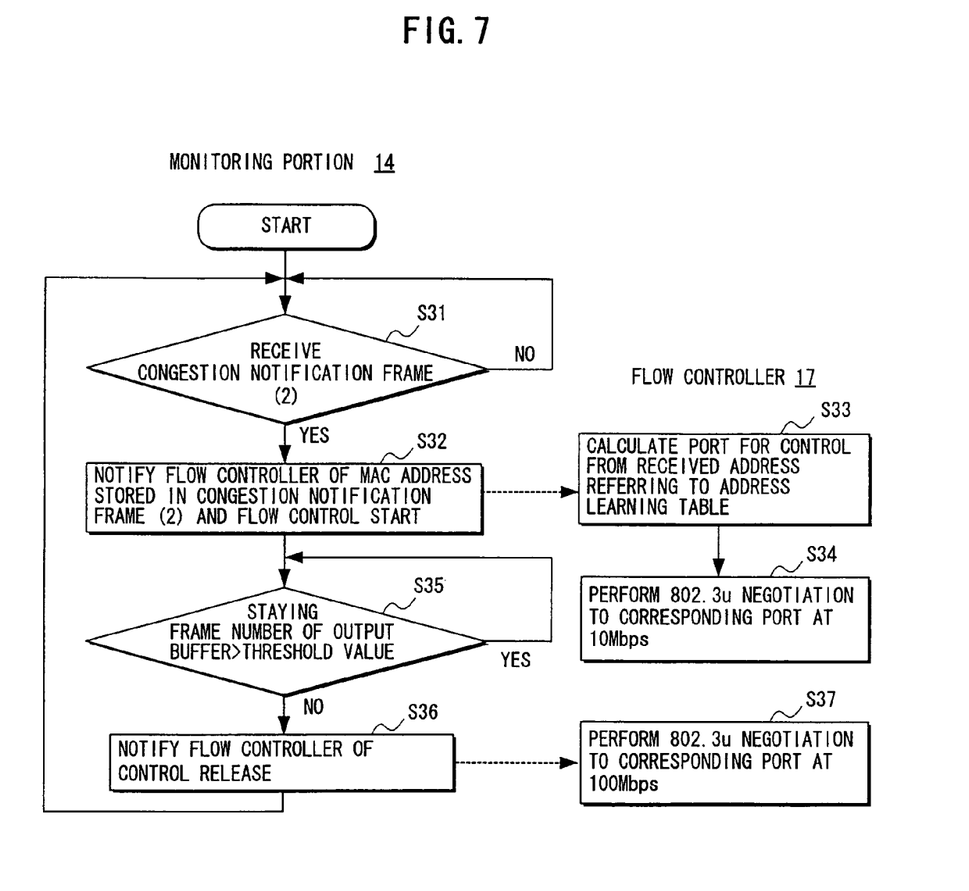
FIG. 7 is a flow chart showing an embodiment of a control using a congestion notification frame (2) in a relaying apparatus according to the present invention.
Figure 8:
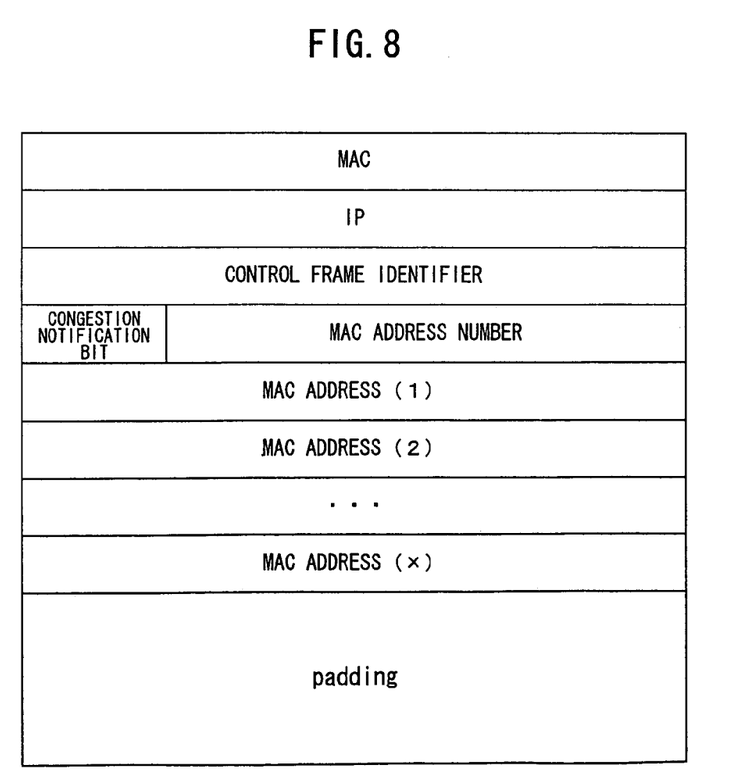
FIG. 8 is a format diagram showing a congestion notification frame (2) used in a relaying apparatus according to the present invention.

Namely, whether or not the congestion notification frame (2) is received by the monitoring portion 14 is determined (at step S31). The embodiment of the congestion notification frame (2) is shown in FIG. 8, in which the congestion notification frame (2) is assumed to be the IP frame addressed to the relaying apparatus in the same way as the embodiment of FIG. 6, and the fields are provided for the identifier indicating the control frame, the bits indicating the congested state of the up-link, the stored MAC address number, and the transmitting source MAC address.

Accordingly, when it is found that the congestion notification frame (2) is received at step S31, the transmitting source MAC address stored in the frame (2) and the flow control start are notified to the flow controller 17 of the corresponding relaying apparatus (at step S32).

At the flow controller 17 which has received such an address, the port to be controlled is calculated at steps S33 and S34 in the same way as the above-mentioned steps S16, S17, and S26, S27, whereby the 802.3u negotiation is performed to the port at 10 Mbps.

As a result of imposing the input restriction in this way, whether or not the staying frame number of the output buffer 13 is less than the threshold value is checked (at step S35). When it is found less than the threshold value, the control release is notified to the flow controller 17 (at step S36), whereby the flow controller 17 performs the 802.3u negotiation by this notification at 100 Mbps to release the input restriction state.

It is to be noted that in the above-mentioned embodiments special congestion notification frames (1) and (2) are used, while a congestion notification signal such as the transmission of all "1" for a fixed time and the repetition of a specified pattern may be physically used in addition to the frames (1) and (2).

As described above, a relaying apparatus according to the present invention is arranged such that an output buffer using an up-link or a stack-link is monitored, when the up-link or the stack-link is in a congested state a transmission restriction is imposed on a port which is a transmitting source of a corresponding frame, and further when a plurality of relaying apparatuses are connected through stack-links the relaying apparatus having the up-link detects the congested state of the up-link and notifies a second relaying apparatus of the congested state to impose a transmission restriction. Therefore, it becomes possible to make an input restriction by the port and to exclude unnecessary communication controls.

What is claimed is:

1. An apparatus comprising:
a switching portion;
a plurality of ports connected to the switching portion;
an up-link monitoring portion which detects a congested state of an up-link, which is a link in an approaching direction toward a backbone network, connected to the ports through the switching portion, and
a flow controller which imposes a transmission restriction on a port using the up-link among the ports for releasing the congested state of the up-link when the up-link monitoring portion detects the congested state of the up-link, wherein the apparatus is connected to a second apparatus with a stack-link, which is a link in a receding direction from the backbone network, further comprising a stack-link monitoring portion which detects a congested state of the stack-link connected to the ports through the switching portion, the flow controller imposing a transmission restriction on a port using the stack-link among the ports for releasing the congested state of the stack-link when the stack-link monitoring portion detects the congested state of the stack-link.

2. The apparatus as claimed in claim 1 wherein the flow controller imposes the transmission restriction by renewing a negotiation with the port and decreasing a link speed.

3. The apparatus as claimed in claim 2 wherein the flow controller imposes the transmission restriction on a minimum number of the ports, among the ports using the up-link, necessary for releasing the congested state.

4. The apparatus as claimed in claim 1 wherein the flow controller imposes the transmission restriction on a minimum number of the ports, among the ports using the up-link, necessary for releasing the congested state.

5. The apparatus as claimed in claim 1 wherein the flow controller imposes the transmission restriction on a minimum number of the ports, among the ports using the stack-link, necessary for releasing the congested state.

6. The apparatus as claimed in claim 1 wherein when detecting the congested state of the up-link the up-link monitoring portion notifies the congested state of the up-link by transmitting a notification frame for an exclusive use to a flow controller of the second apparatus.

7. The apparatus as claimed in claim 6 wherein the notification frame includes MAC addresses of all of the ports using the up-link.

8. The apparatus as claimed in claim 1 wherein when detecting the congested state of the up-link the up-link monitoring portion notifies the congested state of the up-link by transmitting a congestion notification signal of a specific pattern to a flow controller of the second apparatus.

9. The apparatus as claimed in claim 1 wherein when a number of frame staying at an output buffer exceeds a threshold value the up-link monitoring portion recognizes that the congested state of the up-link occurs and provides an MAC address in the frame to the flow controller which has a table for calculating a port corresponding to the MAC address.

10. The apparatus as claimed in claim 9 wherein the table is renewed at a fixed time interval.

11. The apparatus as claimed in claim 1 wherein when a number of frame staying at an output buffer exceeds a threshold value the stack-link monitoring portion recognizes that the congested state of the stack-link occurs and provides an MAC address in the frame to the flow controller which has a table for calculating a port corresponding to the MAC address.

12. The apparatus as claimed in claim 11 wherein the table is renewed at a fixed time interval.

13. The apparatus as claimed in claim 1 wherein when a number of frame staying at an output buffer is equal to or less than a threshold value the up-link monitoring portion transmits a release notification of the congested state of the up-link to the flow controller which releases the transmission restriction.

14. The apparatus as claimed in claim 1 wherein when a number of frame staying at an output buffer is equal to or less than a threshold value the stack-link monitoring portion transmits a release notification of the congested state of the stack-link to the flow controller which releases the transmission restriction.

15. The apparatus of claim 1 further comprising a stack-link monitoring portion which detects a congested state of a stack-link, which is a link in a receding direction from the backbone network, wherein said apparatus is connected to a second apparatus with the stack-link.

* * * * *